(12) United States Patent
Lowder et al.

(10) Patent No.: US 12,197,012 B2
(45) Date of Patent: Jan. 14, 2025

(54) OPTICAL FIBER DEVICES AND METHODS FOR DIRECTING STIMULATED RAMAN SCATTERING (SRS) LIGHT OUT OF A FIBER

(71) Applicant: nLIGHT, Inc., Camas, WA (US)

(72) Inventors: Tyson L. Lowder, Vancouver, WA (US); Dahv A. V. Kliner, Portland, OR (US); C. Geoffrey Fanning, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 401 days.

(21) Appl. No.: 17/417,729

(22) PCT Filed: Dec. 19, 2019

(86) PCT No.: PCT/US2019/067545
§ 371 (c)(1),
(2) Date: Jun. 23, 2021

(87) PCT Pub. No.: WO2020/139705
PCT Pub. Date: Jul. 2, 2020

(65) Prior Publication Data
US 2022/0075121 A1    Mar. 10, 2022

Related U.S. Application Data

(60) Provisional application No. 62/786,173, filed on Dec. 28, 2018.

(51) Int. Cl.
*G02B 6/34* (2006.01)
*G02B 6/02* (2006.01)

(52) U.S. Cl.
CPC ........... *G02B 6/34* (2013.01); *G02B 6/02085* (2013.01)

(58) Field of Classification Search
CPC .............................. G02B 6/34; G02B 6/02085
See application file for complete search history.

(56) References Cited

U.S. PATENT DOCUMENTS

| | | | |
|---|---|---|---|
| 5,764,829 A | 6/1998 | Judkins | |
| 6,404,956 B1 | 6/2002 | Brennan, III et al. | |
| 7,127,139 B2 | 10/2006 | Onaka et al. | |

(Continued)

FOREIGN PATENT DOCUMENTS

| | | | |
|---|---|---|---|
| CN | 108701952 A | | 10/2018 |
| JP | 2003322735 A | * | 11/2003 |
| TW | I341347 B | | 3/2014 |

OTHER PUBLICATIONS

International Search Report and Written Opinion for International Patent Application No. PCT/US2019/067545, mailed Mar. 26, 2020, 7 pages.

*Primary Examiner* — Charlie Y Peng
(74) *Attorney, Agent, or Firm* — WILEY REIN LLP

(57) ABSTRACT

Optical fiber devices, systems, and methods for coupling Raman spectrum out of an optical fiber selectively over a signal spectrum, which may be propagated in one or more guided modes of a fiber system. A fiber system may include a chirped fiber Bragg grating (CFBG) or a long period fiber grating (LPFG), each to unguide Raman light propagating in a core propagation mode of a fiber completely out of the fiber (through any surrounding cladding layer(s)) selectively over signal spectrum which is to remain in a guided mode of the fiber.

19 Claims, 5 Drawing Sheets

(56) References Cited

U.S. PATENT DOCUMENTS

| | | | |
|---|---|---|---|
| 7,804,864 B2* | 9/2010 | Gu | H01S 3/06754 |
| | | | 372/18 |
| 2005/0226278 A1 | 10/2005 | Gu et al. | |
| 2006/0008208 A1 | 1/2006 | Gaylord et al. | |
| 2015/0292956 A1* | 10/2015 | Mitchell | G01K 11/3206 |
| | | | 356/73.1 |
| 2016/0111851 A1 | 4/2016 | Kliner et al. | |
| 2018/0217322 A1 | 8/2018 | Brochu et al. | |
| 2021/0057873 A1* | 2/2021 | Sakamoto | H01S 3/0078 |
| 2022/0069538 A1* | 3/2022 | Lowder | G02B 6/0208 |
| 2022/0094130 A1* | 3/2022 | Lowder | H01S 3/06729 |

* cited by examiner

OPTICAL FIBER DEVICES AND METHODS FOR DIRECTING STIMULATED RAMAN SCATTERING (SRS) LIGHT OUT OF A FIBER

RELATED APPLICATIONS

This application is a National Stage of International Application No. PCT/US2019/067545, filed Dec. 19, 2019, which claims priority to U.S. Provisional Patent Application No. 62/786,173, filed on Dec. 28, 2018 and titled "Optical Fiber Devices and Methods for Directing Stimulated Raman Scattering (SRS) Light Out of a Fiber," which are hereby incorporated by reference in their entireties.

BACKGROUND

The fiber laser industry continues to increase laser performance metrics, such as average power, pulse energy and peak power. Pulse energy and peak power are associated with the storage and extraction of energy in the fiber while mitigating nonlinear processes that can have adverse impacts on the temporal and spectral content of the output pulse. Stimulated Raman Scattering (SRS) light is the result of one such nonlinear process associated with vibrations of the fiber media (e.g., glass). SRS is typically an undesired byproduct of fiber laser and/or fiber power amplifier signal light passing through the optical fibers that these systems comprise.

Generation of SRS light can reduce power in an intended signal output wavelength. SRS generation can also destabilize laser emission resulting in undesired output power fluctuations. SRS generation may also have detrimental effect on the spatial profile of laser system emission. SRS may also be re-introduced in laser and amplifier systems by reflections from objects internal to, or external to, the laser system, such as optics used to manipulate the laser or amplifier output, or the workpiece to which the laser light output is applied. Such reflections can also destabilize the laser emission. Once generated, a laser and/or amplifier of a fiber system may amplify SRS light to the point of causing catastrophic damage to components internal to the system (e.g., a fiber laser, or fiber amplifier). The SRS light may also be detrimental to components external to the fiber system because the external components may not be specified for the wavelength of the SRS light. This mismatch in wavelength between what is delivered versus what is expected can lead to undesirable performance at the workpiece or may cause an eye safety concern for the external system in which the fiber system was integrated. As such, it may be desirable to suppress SRS generation within a fiber system, remove SRS light from a fiber system, and/or otherwise mitigate one or more of the undesirable effects of SRS.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
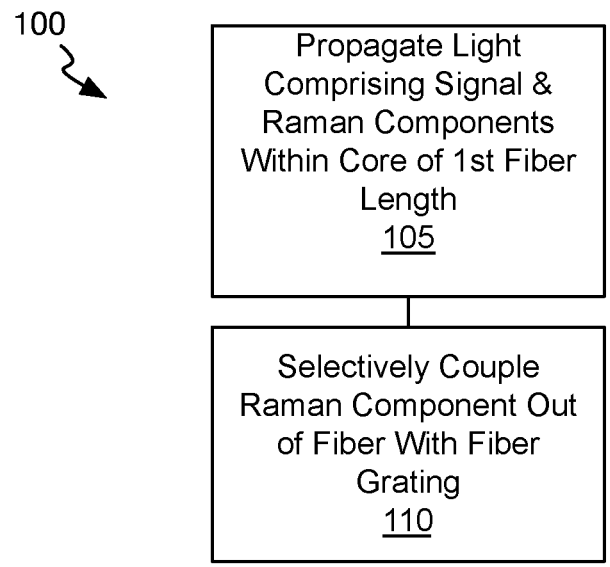
FIG. 1 is a flow chart illustrating methods for selectively coupling Raman spectrum out of an optical fiber, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The term "luminance" is a photometric measure of the luminous intensity per unit area of light travelling in a given direction. The term "numerical aperture" or "NA" of an optical system is a dimensionless number that characterizes the range of angles over which the system can accept or emit light. The term "optical intensity" is not an official (SI) unit, but is used to denote incident power per unit area on a surface or passing through a plane. The term "power density" refers to optical power per unit area, although this is also referred to as "optical intensity" and "fluence." The term "radial beam position" refers to the position of a beam in a fiber measured with respect to the center of the fiber core in a direction perpendicular to the fiber axis. The term "radiance" is the radiation emitted per unit solid angle in a given direction by a unit area of an optical source (e.g., a laser). Radiance may be altered by changing the beam intensity distribution and/or beam divergence profile or distribution. The term "refractive-index profile" or "RIP" refers to the refractive index as a function of position along a line (1D) or in a plane (2D) perpendicular to the fiber axis. Many fibers are azimuthally or roationally symmetric, in which case the 1D RIP is identical for any azimuthal angle. The term "optical power" is energy per unit time, as is delivered by a laser beam, for example. The term "guided light" describes light confined to propagate within an optical waveguide. The term "cladding mode" is a guided propagation mode supported by a waveguide within one or more cladding layer of an optical fiber. The term "unguided light" describes light not confined within any optical waveguide. The term "unguiding" describes an act of transitioning guided light to unguided light.

Described herein are optical fiber devices, systems, and methods suitable for one or more of suppressing SRS generation within a fiber system, removing SRS light from a fiber system, and/or otherwise mitigating one or more of the undesirable effects of SRS within a fiber system. In accordance with some embodiments where light is to be propagated by an optical fiber, a Raman component $I_r$ is selectively unguided out of the fiber core, and if present, out of any surrounding cladding layers of the fiber.

FIG. 1 illustrates methods 100 for selectively unguiding Raman spectrum energy out of an optical fiber, in accordance with some embodiments. Methods 100 are to be distinguished from methods that separate Raman spectrum energy from signal spectrum energy while confining a significant portion of the Raman spectrum energy within some propagation mode of a fiber. Methods 100 begin at block 105 where light is propagated over a first length of fiber, for example predominantly in a core propagation mode. The light propagated at block 105 has both a signal component $I_s$ and a Raman component $I_r$. At block 110, light is unguided out of the core propagation mode, and any other propagation mode supported by the fiber (e.g., a higher order guided core mode, or a guided cladding mode), as a function of wavelength. The Raman component $I_r$ may be removed from the fiber by a grating tuned to discriminate between component wavelengths $\lambda_r$, $\lambda_s$. In some exemplary embodiments, a fiber grating is employed at block 110 to decouple the Raman component $I_r$ out of any mode supported by the fiber while the signal component $I_s$ is maintained in a guided (e.g., core) propagation mode. With the Raman component dissipated by fiber grating, the fiber system may benefit from greater propagation losses for the Raman component than for the signal component.

Figure 2:
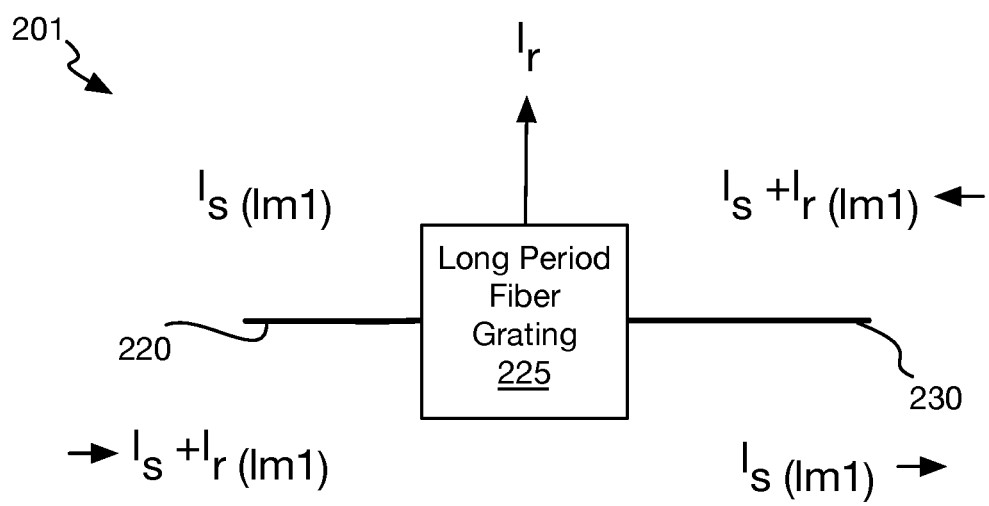
FIG. 2 is a schematic of a device to selectively couple Raman spectrum out of an optical fiber, in accordance with some embodiments.

FIG. 2 is a schematic of a device 201 to selectively unguided Raman spectrum energy out of an optical fiber, in accordance with some long period fiber grating (LPFG) embodiments. Device 201 may be operable to perform methods 100, for example. As shown, device 201 includes a Raman LPFG 225 coupled to propagate signal light between a first fiber length 220, and a second fiber length 230. Light propagated within either of fiber lengths 220 and 230 may comprise a Raman component $I_r$ in addition to a signal component $I_s$. The signal component $I_s$ has some range of power per frequency or wavelength (W/nm) over a predetermined signal spectrum comprising one or more signal wavelengths suitable for high power fiber laser systems (e.g., with a micrometer center wavelength, such as 1050 nm, 1070, 1080, etc.). Similarly, the Raman component $I_r$ has some range of some power per frequency or wavelength (W/nm) over a Raman power spectrum comprising one or more Raman wavelengths. In general, the Raman component $I_r$ spans wavelengths longer than those of the signal component $I_s$ (e.g., a Raman-shifted center wavelength, such as 1100 nm, 1122 nm, 1133 nm, etc.). The Raman component $I_r$ may also have a wider band than the signal component $I_s$.

In the example shown, within fiber length 220 both the signal component $I_s$ and the Raman component $I_r$ propagates in a core guided mode $lm_1$. In some examples, the core guided mode is a linear polarized mode $LP_{1m}$, with one embodiment being the linearly polarized fundamental transverse mode of the optical fiber core, $LP_{01}$. $LP_{01}$ has desirable characteristics in terms of beam shape, minimal beam expansion during propagation through free space (often referred to as "diffraction limited"), and optimum focusability. Hence, fundamental mode $LP_{01}$ propagation is often advantageous in the fiber laser industry.

Raman LPFG 225 is to decouple at least some of the light from the core propagation mode and out of the fiber, escaping all propagation modes supported by fiber length 230. Raman LPFG 225 has a wavelength dependence, which is tuned to interact with the Raman spectrum more than the signal spectrum. Because of the wavelength selectivity, Raman LPFG 225 has higher coupling efficiency within the Raman spectrum, coupling Raman spectrum energy propagating in the core mode more efficiently than signal spectrum energy that falls outside of the band over which Raman LPFG 225 is tuned to interact. The structure of Raman LPFG 225 is advantageously such that Raman spectrum energy propagating in the core mode is not strongly coupled to other modes supported by fiber length 220 and/or 230. For example, if fiber length 220 and/or 230 comprises multimode fiber suitable for supporting multiple core modes, Raman LPFG 225 is not to strongly couple the Raman spectrum between the core modes, but rather is to unguide Ramen spectrum energy. Likewise, if fiber length 220 and/or 230 comprises a cladding layer suitable for supporting a propagation mode, Raman LPFG 225 is not to strongly couple the Raman spectrum into cladding modes. Hence, Raman LPFG 225 may therefore be considered a "Raman-selective," or simply a "Raman" light stripper. In some embodiments, Raman LPFG 225 is embedded within a length of fiber substantially the same as fiber length 230, for example as described in greater detail below.

In some embodiments, fiber lengths 220 and 230 are each capable of supporting only one core guided mode (i.e., fiber lengths 220 and 230 may each comprise single-mode, or SM fiber). In some alternative embodiments, fiber lengths 220 and 230 are each capable of supporting more than one core mode (i.e., fiber lengths 220 and 230 may each comprise multi-mode, or MM fiber). With Raman LPFG 225 tuned to the Raman spectrum, the signal component $I_s$ is free to propagate in the core guided mode $lm_1$ (e.g., $LP_{01}$) of fiber length 230, while the Raman component $I_r$ becomes predominantly unguided by any portion (core or cladding) of fiber length 230. Raman LPFG 225 may unguide a core propagation mode or one or more cladding propagation modes into free-space propagation external of fiber length 230. Notably, with a long grating period (e.g., significantly greater than half a center wavelength of the Raman spectrum), Raman light that is co-propagating with signal component $I_s$ can be gradually unguided. This is in contrast to LPFGs designed instead as a mode convertor for co-propagating core modes. An LPFG in accordance with embodiments herein should also be distinguished from a fiber Bragg grating (FBG) that has a significantly shorter grating period (e.g., no more than half a center wavelength of the Raman spectrum, or around 500-600 nm for an exemplary Raman spectrum of a high power fiber laser signal having a wavelength of around 1070 nm) and would reflect into a counter-propagating mode. Relative to a FBG, Raman LPFG 225 also has the advantage of simpler fabrication as a function of at least the larger grating period.

In the embodiment illustrated in FIG. 2, Raman LPFG 225 is symmetrical to the extent Raman component $I_r$ of light counter-propagating in a core mode (e.g., $lm_1$) of fiber length 230 is also selectively unguided from fiber length 220 (e.g., where fiber lengths 220 and 230 comprise similar cladding architectures). Any signal component $I_s$ however remains free to propagate in the core guided mode $lm_1$ (e.g., $LP_{01}$) of fiber length 220.

Figure 3A:
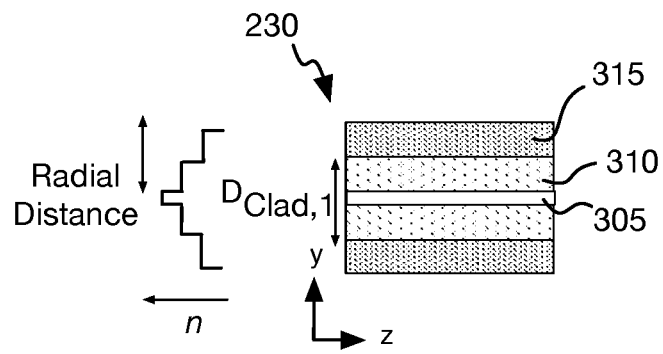
FIGS. 3A and 3B are longitudinal and transverse cross-sectional views of a fiber, in accordance with some embodiments.
Figure 3B:
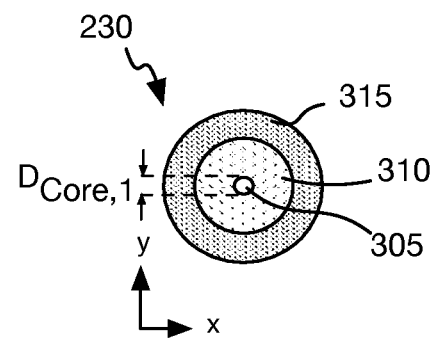

FIGS. 3A and 3B are longitudinal and transverse cross-sectional views of fiber 230, respectively, in accordance with some multi-clad fiber embodiments. Although a double clad fiber embodiment is illustrated, fiber length 230 may have any number of cladding layers (e.g., single or triple, etc.) known to be suitable for an optical fiber. In the example illustrated in FIGS. 3A and 3B, fiber length 230 has a central core 305, and an inner cladding 310, which is annular and encompasses core 305. An annular outer cladding 315 surrounds inner cladding 310. Core 305 and inner cladding 310 may have any suitable composition (e.g., glass). Outer cladding 315 may be a polymer or also glass, for example. Although not depicted, one or more protective (non-optical) coatings may further surround outer cladding 315. For single clad embodiments, core 305 may simply be surrounded by a protective (non-optical) coating, or there may only be outer cladding 315, which has insufficient index contrast with free space or a surrounding protective coating to support any guided cladding modes.

Fiber length 230 may have any suitable refractive index profile (RIP). As used herein, the "refractive-index profile" or "RIP" refers to the refractive index as a function of position along a line (e.g., x or y axis in FIG. 3B) or in a plane (e.g. x-y plane in FIG. 3B) perpendicular to the fiber axis (e.g., z-axis in FIG. 3A). In the example shown in FIG. 3A, the RIP is rotationally symmetric, in which case the RIP is identical for any azimuthal angle. Alternatively, for example as for birefringent fiber architectures, the RIP may vary as a function of azimuthal angle. Core 305, inner cladding 310, and outer cladding 315 can each have any RIP, including, but not limited to, a step-index and graded-index. A "step-index fiber" has a RIP that is substantially flat (refractive index independent of position) within fiber core 305. Inner cladding 310 may also have a substantially flat RI over $D_{Clad,1}$ with a RIP of fiber length 230 stepped at the interface between core 305 and inner cladding 310. An example of one illustrative stepped RIP suitable for a fiber laser is shown in FIG. 3A. Alternatively, one or more of core 305 and inner cladding 310 may have a "graded-index" in which the RI varies (e.g., decreases) with increasing radial position (i.e., with increasing distance from the core and/or cladding axis).

In accordance with some embodiments, core 305 is suitable for multi-mode propagation of light. With sufficient core diameter $D_{core,1}$, and/or numerical aperture (NA) contrast, fiber length 230 will support the propagation of more than one transverse optical mode within core 305. In other embodiments, core 305 has a diameter and NA sufficient to support only the propagation of a single (fundamental) transverse optical mode. In some exemplary embodiments, the core diameter $D_{core,1}$ is in the range of 10-100 micron (μm) and the inner cladding diameter $D_{Clad,1}$ is in the range of 100-1000 μm, although other values for each are possible.

Inner cladding 310 may have an area larger than that of the core 305, and may also have a higher NA. Inner cladding 310 supports at least one propagation mode, but may support a large number of such modes. In accordance with some advantageous embodiments, Raman LPFG 225 is not to strongly couple the Raman component $I_r$ into any of these guided cladding modes, but rather is to unguide the Raman component $I_r$ out of inner cladding 310 and into a continuum of radiation and/or leaky modes. How strongly the modes become unguided is a function of the design of the grating and how strongly the grating is made to interact with the targeted modes. Although core 305 and inner cladding 310 is illustrated as being concentric (i.e., a centered core), they need not be. One or more of core 305 cladding 310 may also be a variety of shapes other than circular, such as, but not limited to annular, polygonal, arcuate, elliptical, or irregular. Core 305 and inner cladding 310 in the illustrated embodiments are co-axial, but may alternatively have axes offset with respect to one another. Although $D_{Clad,1}$ and $D_{core,1}$ are illustrated to be constants about a central fiber axis in the longitudinal direction (z-axis in FIG. 2A). The diameters $D_{Clad,1}$ and $D_{Core,1}$ may instead vary over a longitudinal length of fiber 230.

In further reference to device 201 (FIG. 2), fiber length 220 may have any of the properties described above for fiber length 230. In some embodiments, fiber length 220 has substantially the same core and cladding architecture as fiber length 230. For example, fiber length 220 may also comprise double-clad fiber. Fiber length 220 may be substantially identical to fiber length 230, for example having the same core and cladding architecture, compositions, and dimensions (e.g., diameters). For such embodiments, fiber length 220 also supports one or more core guided modes and one or more cladding guided modes.

Figure 4A:
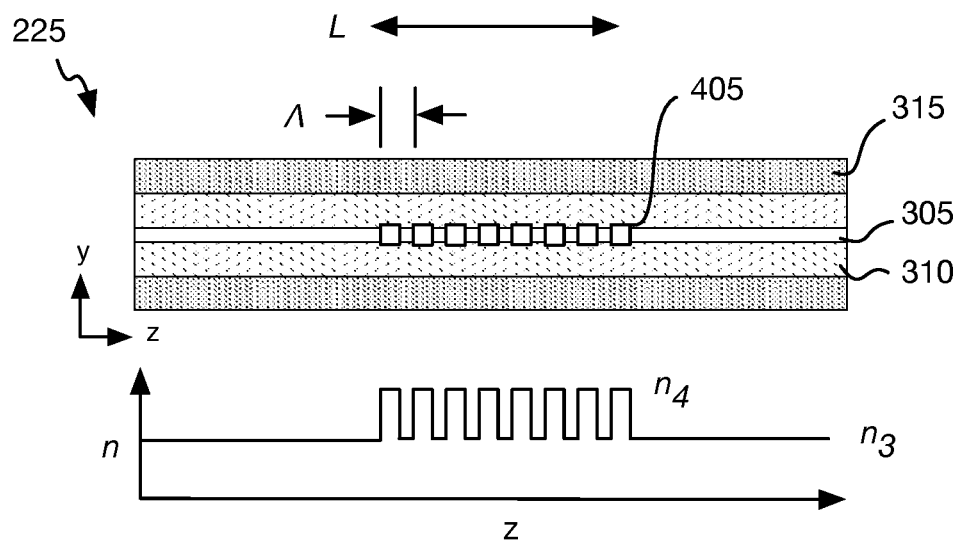
FIG. 4A is a longitudinal cross-sectional view of a fiber length that includes a long period fiber grating (LPFG), in accordance with some embodiments.

Raman LPFG 225 may have a variety of architectures that are capable of unguiding a target spectral bandwidth (e.g., Raman component $I_r$) from a core mode (e.g., $LP_{01}$), through any cladding, out of the fiber (e.g., into free space or to some suitable beam dump and/or heatsink). FIG. 4A is a longitudinal cross-sectional view of a length of fiber that includes an exemplary Raman LPFG 225, in accordance with some embodiments. Raman LPFG 225 is to interact with the core modes electric field. This can be through direct interaction, or evanescence. Raman LPFG 225 can therefore be in the cladding, or even comprise external surface perturbations. In the example shown however, Raman LPFG 225 comprises refractive index (RI) perturbations 405 within at least fiber core 305 over a grating length L. In the illustrated example, Raman LPFG 225 is within a double-clad fiber, and RI perturbations 405 have a refractive index $n_4$ that is higher than a nominal core index $n_3$. For embodiments where outer cladding 315 has an index $n_1$, and inner cladding 310 has an index $n_2$, RI within mode Raman LPFG 225 may vary as $n_1<n_2<n_3<n_4$. RI perturbations 405 may impact light guided within core 305 over a target range of wavelengths while light outside of the target band may be substantially unaffected by RI perturbations 405.

RI perturbations 405 are illustrated to have a period of Λ. Grating period Λ may vary with Raman spectrum, but as noted above is to be at least greater than half of a center Raman wavelength. In some examples where the center Raman wavelength is 1100 nm, or more, grating period Λ is 600 nm, or more. In some other embodiments, grating period Λ is two or more times half the center Raman wavelength, for example ranging from 100-1000 µm. Although a fixed period fiber grating is illustrated in FIG. 4A, aperiodic (i.e., chirped), apodized, or superstructure grating embodiments may also be suitable implementations of a Raman LPFG 225. For example, chirped embodiments of long-period grating architectures may offer a wider spectral response than their periodic counterparts. Apodized embodiments of long-period grating architectures may, for example, improve mode separation of the Raman spectrum from signal spectrum. Superstructure embodiments may include a variety of long period grating structures (e.g., including both chirp and apodization structures).

Figure 4B:
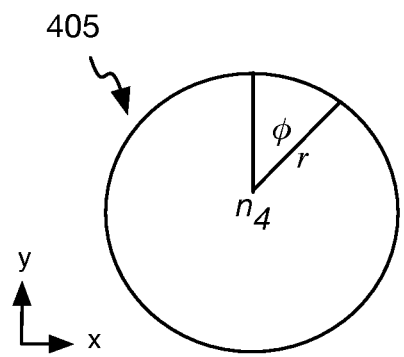
FIG. 4B is a transverse cross-sectional view through one portion of the LPFG illustrated in FIG. 4A in accordance with a symmetric grating embodiment.
Figure 4C:
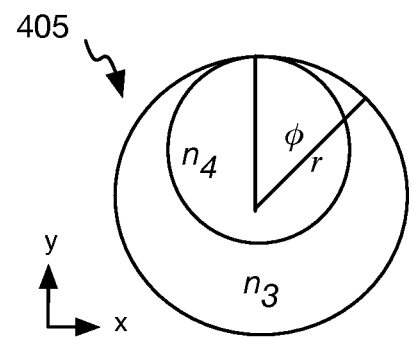
FIG. 4C is a transverse cross-sectional view through one portion of the LPFG illustrated in FIG. 4A in accordance with an asymmetric grating embodiment.

A coupling efficiency associated Raman LPFG 225 and indicative of the ability to selectively unguide Raman component $I_r$, may depend not only on the amplitude of RI modulation and the grating length L, but also on a three-dimensional shape of the grating. In some embodiments, Raman LPFG 225 comprises a cylindrically, or rotationally, symmetric grating with RI perturbations being independent of azimuthal angle (e.g., substantially orthogonal to the fiber axis) and/or core radius. FIG. 4B is a transverse cross-sectional view of Raman LPFG 225 through one RI perturbation 405, in accordance with a cylindrically symmetric grating embodiment. As shown, within an x-y plane of an RI perturbation 405, the index is independent of azimuthal angle ω and core radius r (e.g., RI being $n_4$ everywhere within the x-y plane). In some alternative embodiments, a Raman propagation mode coupler comprises a cylindrically asymmetric grating with RI perturbations that are dependent on azimuthal angle (e.g., RI perturbations slanted from orthogonal to the fiber axis) and/or core radius. FIG. 4C is a transverse cross-sectional view through one portion of fiber grating 225, in accordance with cylindrically, or rotationally, asymmetric, or "slanted," grating embodiments. As shown, the index may be dependent on azimuthal angle φ (e.g., varying from $n_3$ to $n_4$) and/or core radius r within an x-y plane of RI perturbation 405. Such slanted grating embodiments may have the advantage of greater scattering into radiation or leaky modes relative to symmetrical embodiments. Symmetric grating embodiments may scatter a smaller amount of light into such radiation modes, and it is a matter of design requirements as to what amount is large enough to achieve a desired reduction of SRS.

Figure 5:
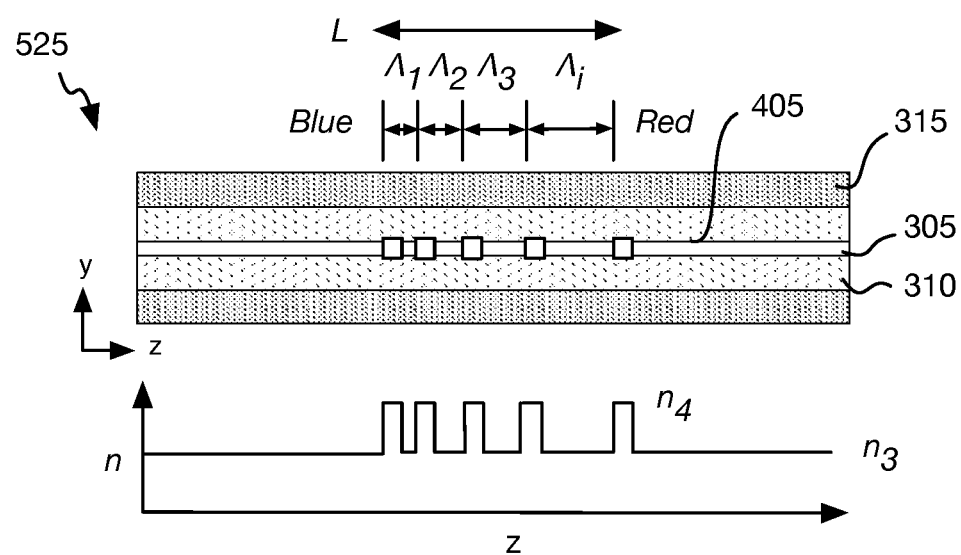
FIG. 5 is a longitudinal cross-sectional view of a fiber length that includes a chirped fiber Bragg grating (CFBG), in accordance with some embodiments.

In some other embodiments, a chirped fiber Bragg grating (CFBG) is employed to selectively unguide Raman spectrum energy from core and/or cladding modes of an optical fiber. FIG. 5 is a longitudinal cross-sectional view of a fiber length that includes a Raman CFBG 525, in accordance with some embodiments. Raman CFBG 525 comprises refractive index (RI) perturbations 405 within at least fiber core 305 over a grating length L. Raman CFBG 525 is integrated into a double-clad fiber, but similar grating structures may also be integrated into other fiber architectures capable of supporting one or more guided cladding modes. As for LPFG embodiments described above, RI perturbations 405 have a refractive index $n_4$ that is higher than a nominal core index $n_3$. For embodiments where outer cladding 315 has an index $n_1$, and inner cladding 310 has an index $n_2$, RI within mode Raman LPFG 225 may similarly vary as $n_1<n_2<n_3<n_4$.

For Raman CFBG 525, RI perturbations 405 have a period that varies over grating length L. CFBG 525 is therefore longitudinally asymmetric having a first "blue" end with a shortest grating period $Λ_1$, and a second "red" end with a longest period $Λ_i$. Grating periods $Λ_1$ and $Λ_i$ may each vary based on the Raman spectrum to which CFBG 525 is tuned. In exemplary embodiments, the longest grating period $Λ_i$ is less than grating period Λ of LPFG embodiments while the shortest grating period $Λ_1$ is less than half of a center Raman wavelength. In some examples where the center Raman wavelength is around 1100 nm, the shortest grating period $Λ_1$ is 200-550 nm. In some such embodiments, grating period $Λ_i$ is less than 5 µm. The grating period may vary between the shortest and longest periods, for example by 10 s or 100 s of nm, according to any function (e.g., linear) over grating length L.

Figure 6:
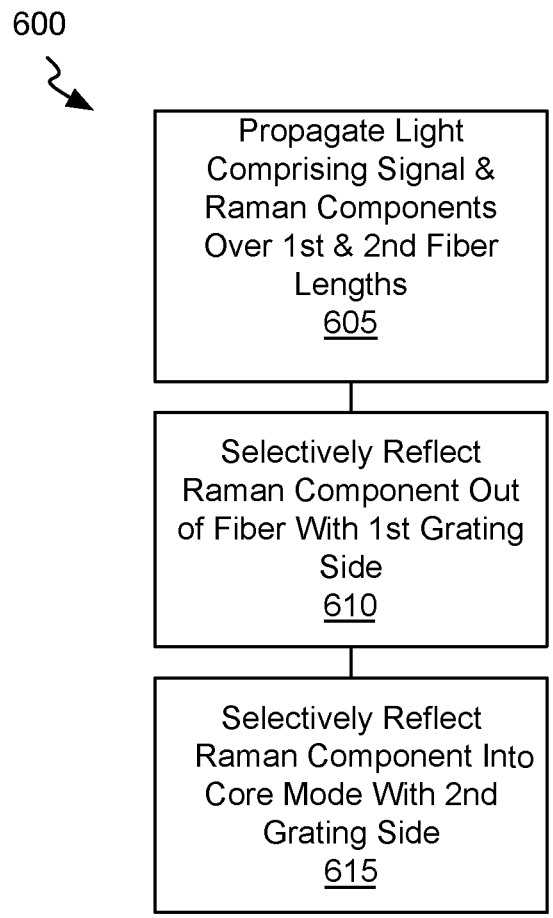
FIG. 6 is a flow chart illustrating methods of selectively removing Raman spectrum from a fiber system with a chirped fiber Bragg grating (CFBG), in accordance with some embodiments.

FIG. 6 is a flow chart illustrating methods 600 for selectively removing Raman spectrum from a fiber system with a chirped fiber Bragg grating (CFBG). Methods 600 may be implemented with CFBG 525 for embodiments where one end of the grating has a sufficiently short period that the Raman component $I_r$ will satisfy a Bragg condition and be reflected in a manner that escapes fiber confinement. The variation in period over the grating length may further result in an asymmetric treatment of the Raman component $I_r$ that is dependent on the orientation of the CFBG 525 relative to the direction of light propagation within a fiber. In FIG. 6, for example, methods 600 begin at block 605 where light is propagated over first and second lengths of fiber predominantly in a core propagation mode. The first and second lengths of fiber are coupled to opposite ends of a CFBG, for example with the first fiber length coupled to the blue end and the second fiber length coupled to the red end. The light propagated at block 605 has both a signal component $I_s$ and a Raman component $I_r$. At block 610, a CFBG tuned to the Raman component wavelengths $\lambda_r$ selectively reflects the Raman component $I_r$ incident to the red end of a CFBG into primarily a counter-propagating unguided wave, while signal component $I_s$ incident to the red end of a CFBG is maintained primarily in a core propagation mode. At block 615, a CFBG tuned to the Raman component wavelengths $\lambda_r$ selectively reflects the Raman component $I_r$ incident to the blue end of a CFBG into primarily a counter-propagating (guided) core mode, while signal component $I_s$ incident to the blue end of a CFBG is maintained primarily in the core propagation mode. Hence, injecting light from the red side of the grating will result in scattering into HOMs and radiation modes (though not completely, as some of the light can be expected to reflect back into the counter-propagating core mode). Incident light from the blue side of the grating however will usually not scatter into HOM or radiation modes, and will more efficiently couple into the counter propagating core mode. Accordingly, a Raman CFBG may be employed to unguide a dominant propagation mode of the Raman component $I_r$ while the signal component $I_s$ remains predominantly in a guided (e.g., core) propagation mode. As such, a Raman CFBG in accordance with embodiments may be integrated into a fiber system to suppress, or otherwise mitigate, effects of Raman light within the fiber system.

Figure 7:
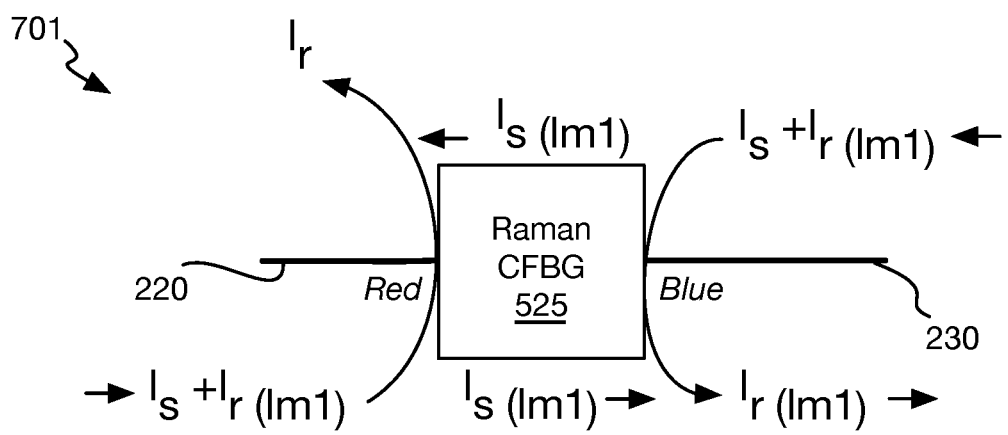
FIG. 7 is a schematic of a device to selectively couple Raman spectrum out of a fiber, in accordance with some CFBG embodiments.

FIG. 7 is a schematic of a fiber device 701 to selectively unguide Raman spectrum from a core propagation mode of a fiber, in accordance with some CFBG embodiments. In this example, CFBG 525 has a red end coupled to fiber length 220 and a blue end coupled to fiber length 230. CFBG 525 is to reflect a Raman component $I_r$ propagated within a core propagation mode (e.g., $lm_1$) that is incident to the red end out of the core and into free space (e.g., also out of any cladding) where it may be dissipated in some manner external fiber length 220. CFBG 525 is not to significantly reflect the signal component $I_s$, and so signal component $I_s$ propagates within a core propagation mode (e.g., $lm_1$) of fiber length 230. For a Raman component $I_r$ propagated within a core propagation mode (e.g., $lm_1$) in a direction incident to the blue end, CFBG 525 is to reflect the Raman component in the core propagation mode (e.g., $lm_1$) where it counter-propagates within fiber length 230. The signal component $I_s$, in contrast, freely propagates through CFBG 525 and remains within a core propagation mode (e.g., $lm_1$) of fiber length 220.

Figure 8A:
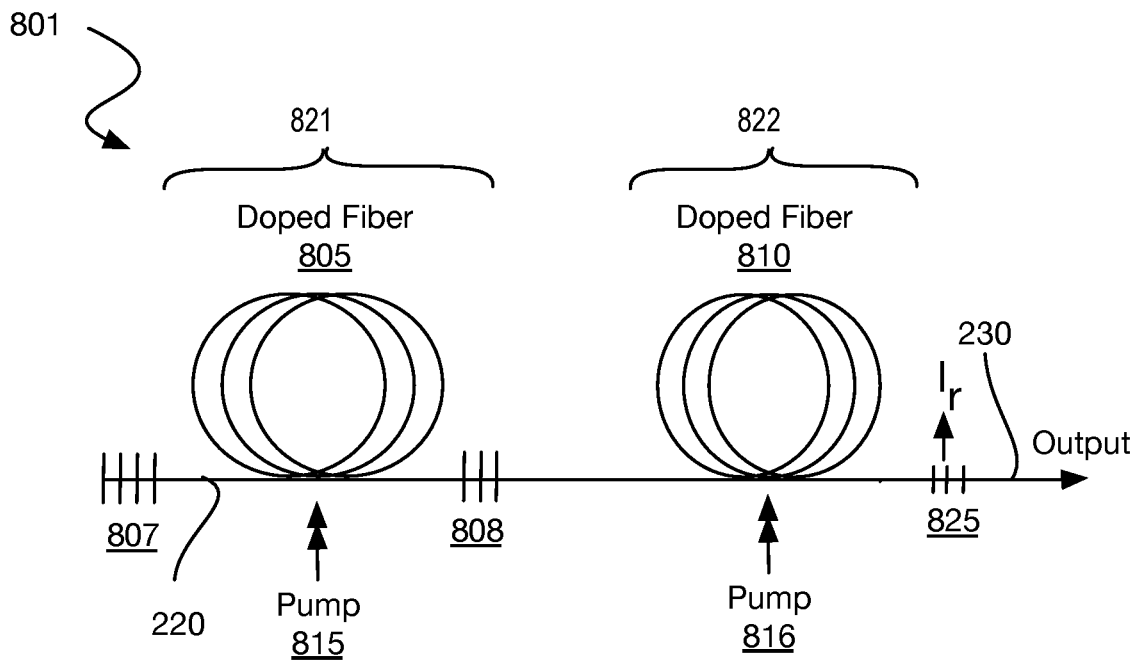
FIGS. 8A and 8B are schematics of fiber systems comprising an optical oscillator, an optical power amplifier, and a LPFG or CFBG, in accordance with some embodiments.
Figure 8B:
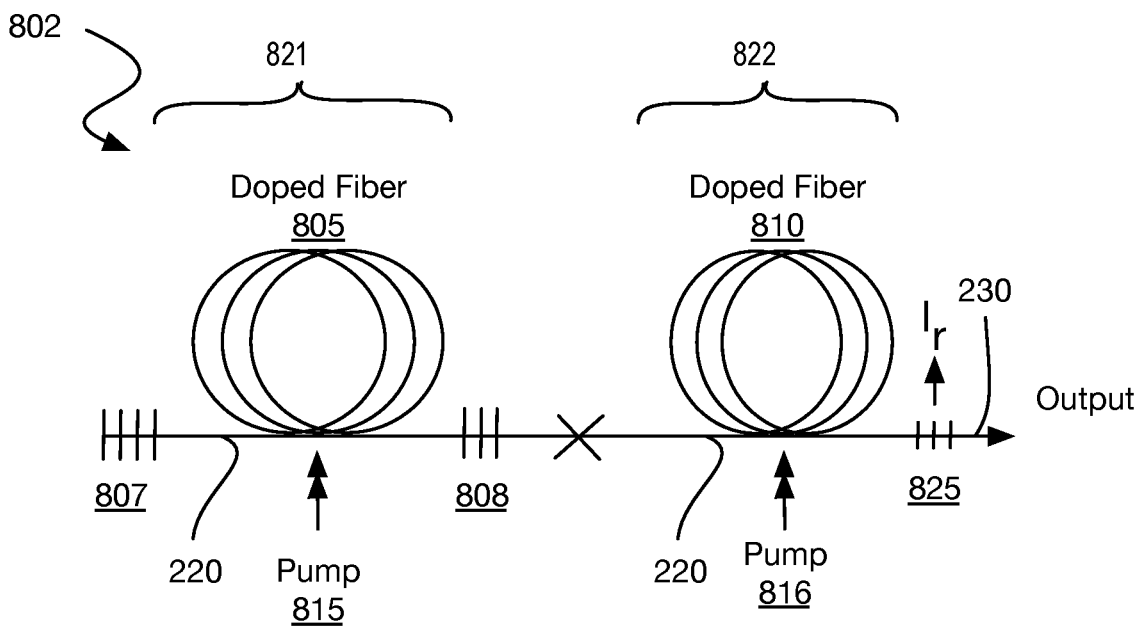

One or more of the fiber devices described above may be incorporated into a larger fiber system, for example one that includes a fiber optic oscillator or resonant cavity, and/or includes a fiber power amplifier. FIG. 8, for example, is a schematic of a fiber laser system 801 that comprises both an optical oscillator 821, and an optical power amplifier 822. System 801 further includes a Raman fiber grating 825 suitable for selectively coupling Raman spectrum out of any and/or all guided modes of fiber 230. In some advantageous embodiments, Raman fiber grating 825 is implemented as CFBG 525, and may have any of the attributes described above in the context of CFBG 525. In other advantageous embodiments, Raman fiber grating 825 is implemented as LPFG 225, and may have any of the attributes described above in the context of CFBG 525. In the presence of Raman fiber grating 825, Raman spectrum within laser system 801 can be expected to have lower intensity.

Fiber optic oscillator 821 is to generate an optical laser beam by exciting a signal spectrum of light. Oscillator 821 comprises an optical cavity defined by a strong fiber grating 807 and a fiber-to-fiber coupler (FFC) 808 with a doped fiber length 805 between grating 807 and FFC 808. Doped fiber length 805 may comprise a variety of materials, such as, $SiO_2$, $SiO_2$ doped with $GeO_2$, germanosilicate, phosphorus pentoxide, phosphosilicate, $Al_2O_3$, aluminosilicate, or the like, or any combinations thereof. In some embodiments, the dopants are optically active and may comprise rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like, or any combination thereof to provide optical power gain. Doped fiber length 805 may comprise a multi-clad fiber, for example substantially as described above for fiber length 230, in which at least the core is doped with gain media. Doped fiber length 805 may alternatively comprise a single-clad fiber, or any other fiber architecture known to be suitable for a fiber laser. Fiber oscillator 821 is optically coupled to a pump light source 815, which may be a solid state diode laser, or lamp, for example. Where fiber oscillator 821 comprises a multi-clad fiber, pump light source 815 may be coupled into a cladding layer of doped fiber length 805 in either a co-propagating or counter-propagating manner. In some embodiments, doped fiber length 805 comprises multi-mode fiber supporting multiple propagation modes within a fiber core (e.g., substantially as described above for fiber 230). However, in some alternative embodiments doped fiber length 805 comprises a single-mode fiber capable of supporting only one propagation mode within the fiber core.

Fiber power amplifier 822 is to increase radiance of at least the signal spectrum excited by oscillator 821. Fiber amplifier 822 is optically coupled to a pump light source 816, which may also be a solid state diode laser, or lamp, for example. Fiber power amplifier 822 includes a doped fiber length 810, which may have any of the properties described above for doped fiber length 805. For example, in some embodiments, doped fiber length 810 comprises an optically active dopant such as rare-earth ions like $Er^{3+}$ (erbium), $Yb^{3+}$ (ytterbium), $Nd^{3+}$ (neodymium), $Tm^{3+}$ (thulium), $Ho^{3+}$ (holmium), or the like, or any combination thereof known to be suitable for providing optical power gain. Doped fiber length 810 may comprise a multi-clad fiber, for example substantially as described above for fiber length 230, where at least the core is doped with a gain medium. In some embodiments, doped fiber length 810 comprises a multi-mode fiber supporting multiple propagation modes within a fiber core (e.g., substantially as described above for fiber 230). In some advantageous embodiments doped fiber length 805 comprises single-mode fiber capable of supporting only one guided propagation mode within the fiber core, and doped fiber length 810 comprises a multi-mode fiber capable of supporting multiple propagation modes within the fiber core.

In accordance with some embodiments, fiber grating 825 is positioned between an output of fiber system 801 and oscillator 821. The system output may be coupled to a delivery fiber that is further coupled to a process head, for example. For some embodiments further including an optical amplifier (e.g., power amplifier 822), a Raman grating is positioned between the fiber system output and the amplifier (e.g., with grating 825 separated from oscillator 821 by power amplifier 822).

For embodiments where grating 825 comprises a CFBG (e.g., CFBG 525 substantially as described above), grating 825 may be oriented with the blue end proximal to an output of fiber system 801 and a red end proximal to fiber oscillator 821 (and/or proximal to fiber power amplifier 822). In this orientation, Raman light propagating in fiber length 230 toward fiber oscillator 821 in a core mode of fiber 230 (e.g., back-reflected from a workpiece into a process head coupled to fiber system 801) is reflected by grating 825 back toward the fiber system output in the core mode. The CFBG will therefore exclude back-reflected Raman spectrum from fiber oscillator 821 and/or fiber power amplifier 822. Raman light propagated from fiber oscillator 821 in a core mode of fiber 230 (e.g., amplified by signal light within doped fiber lengths 805 and/or 810) will be unguided by grating 825. Therefore, much less Raman light will return to fiber oscillator 821 and/or fiber amplifier 822. This general system architecture may be extended for any number of optical oscillators. For example, one CFBG may be so positioned for each optical oscillator upstream of an optical multiplexer/combiner. This general system architecture may also be extended for any number of optical amplifier gain stages. For example, one CFBG may be so positioned between two adjacent fiber optic amplifier gain stages.

For embodiments where grating 825 comprises a LPFG (e.g., LPFG 225 substantially as described above), grating 825 may be positioned substantially as illustrated in FIG. 8, or may alternatively be positioned between oscillator 821 and amplifier 822. During operation of system 801, the LPFG will unguide Raman spectrum that is propagating in a core mode or cladding mode to or from (e.g., back-reflected) the fiber system.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should therefore be determined with reference to the appended claims, along with the full scope of equivalents to which such claims are entitled.

What is claimed is:

1. An optical fiber device, comprising:
   a first and a second length of optical fiber, each of the lengths of optical fiber comprising a core and one or more cladding layers, wherein the core supports at least a first propagation mode for light comprising both signal spectrum and Raman spectrum, wherein the one or more cladding layers of at least the second length of optical fiber further comprise an inner cladding layer and an outer cladding layer; and
   a chirped fiber Bragg grating (CFBG) between the first and second lengths of fiber, the CFBG to unguide at least some of the light propagated in the first propagation mode with a greater efficiency over the Raman spectrum than over the signal spectrum, and to unguide at least a portion of the light within the Raman spectrum into a free-space propagation mode beyond the inner cladding layer of the second length of optical fiber and transverse to a direction of signal propagation.

2. The optical fiber device of claim 1, wherein:
   the Raman spectrum comprises one or more first wavelengths that are longer than one or more second wavelengths of the signal spectrum;
   the CFBG comprises a third length of optical fiber further comprising a core, an inner cladding layer, and an outer cladding layer in contact with the inner cladding layer, wherein a refractive index of the core alternates between two values as a function of a periodicity of the CFBG that varies over the third length.

3. The optical fiber device of claim 2, wherein the CFBG has a refractive index that varies azimuthally within the core.

4. The optical fiber device of claim 2, further comprising an optical oscillator operable to excite at least the signal spectrum, and the optical oscillator coupled to the second length of optical fiber with the CFBG between the optical oscillator and the first length of optical fiber.

5. The optical fiber device of claim 4, wherein:
   the optical oscillator comprises a length of single mode (SM) fiber having a core that supports only the first propagation mode; and
   the second length of optical fiber comprises multi-mode (MM) fiber, the core of which supports one or more guided propagation modes in addition to the first propagation mode.

6. The optical fiber device of claim 5, further comprising an optical amplifier between the optical oscillator and the CFBG, the optical amplifier comprising a length of MM fiber doped with a gain medium operable to excite at least the signal spectrum.

7. An optical fiber device, comprising:
   a first and a second length of optical fiber, each of the lengths of optical fiber comprising a core and one or more cladding layers, wherein the core supports at least a first propagation mode for light comprising both signal spectrum and Raman spectrum, wherein the one or more cladding layers of each of the first length of optical fiber and the second length of optical fiber further comprise an inner cladding layer and an outer cladding layer; and
   a long period fiber grating (LPFG) between the first and second lengths of fiber, the LPFG having a period greater than half a center wavelength of the Raman spectrum, and to unguide at least some of the light propagated in a first guided mode with a greater efficiency over the Raman spectrum than over the signal spectrum, and wherein the LPFG is to unguide at least a portion of the light within the Raman spectrum into a free-space propagation mode through the inner cladding layer of the first or second lengths of fiber and transverse to a direction of signal propagation.

8. The optical fiber device of claim 7, wherein:
   the Raman spectrum comprises one or more first wavelengths that are longer than one or more second wavelengths of the signal spectrum; and
   the LPFG comprises a third length of optical fiber further comprising a core and an inner cladding layer and an outer cladding layer, wherein a refractive index of the core varies between two values over the third length and with a period that exceeds 100 µm.

9. The optical fiber device of claim 8, wherein the LPFG has a refractive index that varies azimuthally within the core.

10. The optical fiber device of claim 8, further comprising an optical oscillator to excite at least the signal spectrum, wherein the optical oscillator is coupled to the first length of optical fiber with the LPFG between the optical oscillator and the second length of optical fiber.

11. The optical fiber device of claim 10, wherein:
the optical oscillator comprises a length of single mode (SM) fiber having a core that supports only the first propagation mode; and
the second length of optical fiber comprises multi-mode (MM) fiber, the core of which supports one or more guided modes in addition to the first propagation mode.

12. The optical fiber device of claim 11, further comprising an optical amplifier between the optical oscillator and the LPFG, the optical amplifier comprising a length of MM fiber having a core doped with a gain medium to excite at least the signal spectrum.

13. A method of filtering Raman spectrum from an optical fiber system, the method comprising:
propagating light in a core mode of a first length of optical fiber, wherein the first length of optical fiber comprises a core and one or more cladding layers, and the light comprises both signal spectrum and Raman spectrum; and
unguiding with a fiber grating at least some of the light from the core mode into free-space propagation transverse to a direction of signal propagation, the unguiding being selective to light within the Raman spectrum, wherein the fiber grating comprises a chirped fiber Bragg grating (CFBG) or a long period fiber grating (LPFG).

14. The method of claim 13, wherein:
the one or more cladding layers of both the first and second lengths of fiber further comprise an inner cladding layer and an outer cladding layer; and
unguiding at least some of the light from the core mode further comprises unguiding the light through the inner cladding layer.

15. The method of claim 14, wherein:
the unguiding further comprises unguiding Raman spectrum energy in a first propagation mode with the CFBG.

16. The method of claim 15, wherein a first end of the CFBG having a larger period is proximal to an optical oscillator of the fiber system, and second end of the CFBG having a shorter period is proximal to an output of the fiber system.

17. The method of claim 15, wherein the CFBG has a smallest period that is no more than half a center wavelength of the Raman spectrum.

18. The method of claim 14, wherein:
the unguiding further comprises unguiding Raman spectrum energy in the first propagation mode with the LPFG.

19. The method of claim 18, wherein the LPFG has a period that is no less than half a center wavelength of the Raman spectrum.

* * * * *